(12) United States Patent
Kumler

(10) Patent No.: US 6,831,680 B1
(45) Date of Patent: Dec. 14, 2004

(54) METHOD AND SYSTEM OF MONITORING AN AIRCRAFT USING A FISHEYE LENS SYSTEM

(75) Inventor: James J. Kumler, Jupiter, FL (US)

(73) Assignee: Coastal Optical Systems, Inc., West Palm Beach, FL (US)

( * ) Notice: Subject to any disclaimer, the term of this patent is extended or adjusted under 35 U.S.C. 154(b) by 461 days.

(21) Appl. No.: 09/713,079

(22) Filed: Nov. 15, 2000

Related U.S. Application Data

(60) Provisional application No. 60/166,294, filed on Nov. 18, 1999.

(51) Int. Cl.⁷ .................................................. H04N 7/18
(52) U.S. Cl. ........................ 348/148; 348/151; 348/159
(58) Field of Search ............................... 348/142–160; 725/125, 105, 107–110

(56) References Cited

U.S. PATENT DOCUMENTS

| | | | |
|---|---|---|---|
| 3,176,602 A | | 4/1965 | Wilt |
| 3,885,090 A | | 5/1975 | Rosenbuam |
| 4,001,881 A | | 1/1977 | Folsom |
| 4,093,364 A | | 6/1978 | Miller |
| 4,214,265 A | | 7/1980 | Olesen |
| 4,281,354 A | | 7/1981 | Conte |
| 4,396,942 A | | 8/1983 | Gates |
| 4,420,238 A | | 12/1983 | Felix |
| 4,533,962 A | | 8/1985 | Decker et al. |
| 4,568,972 A | | 2/1986 | Arents |
| 4,578,665 A | | 3/1986 | Yang |
| 4,630,110 A | | 12/1986 | Cotton et al. |
| 4,789,904 A | | 12/1988 | Peterson |
| 4,816,828 A | * | 3/1989 | Feher .......................... 340/945 |
| 4,831,438 A | * | 5/1989 | Bellman, Jr. et al. ....... 358/108 |
| 4,843,463 A | | 6/1989 | Michetti |
| 4,949,186 A | | 8/1990 | Peterson |
| 5,144,661 A | * | 9/1992 | Shamosh et al. ............... 380/9 |
| 5,283,643 A | * | 2/1994 | Fujimoto ..................... 348/143 |
| 5,574,497 A | * | 11/1996 | Henderson et al. ......... 348/144 |
| 5,742,336 A | | 4/1998 | Lee |
| 6,119,096 A | * | 9/2000 | Mann et al. ................... 705/5 |
| 6,264,135 B1 | * | 7/2001 | Dacosta ...................... 244/1 R |
| 6,366,311 B1 | * | 4/2002 | Monroe ....................... 348/148 |
| 6,373,521 B1 | * | 4/2002 | Carter ......................... 348/144 |
| 6,405,975 B1 | * | 6/2002 | Sankrithi et al. ........... 244/1 R |

FOREIGN PATENT DOCUMENTS

| | | |
|---|---|---|
| DE | 7700054 | 1/1977 |

* cited by examiner

*Primary Examiner*—Andy Rao
(74) *Attorney, Agent, or Firm*—Lathrop & Gage, LC

(57) ABSTRACT

An aircraft monitoring system is disclosed that is comprised of a fisheye lens system and a data storage system. The fisheye lens system is configured to mount in an aircraft. The fisheye lens system captures images that represent a hemispherical field of view of about 180-degrees. The field of view is of an interior portion of the aircraft. The fisheye lens system transfers the images to the data storage system. The data storage system stores the images. The interior portion of the aircraft could be the cockpit, cabin, luggage compartment, or some other area in the aircraft. The aircraft monitoring system further includes an independent power supply that operates even if the aircraft loses power. In some examples, the fisheye lens system also transfers the images to a video transmitter. The video transmitter transmits the images to a receiver on the ground to provide video monitoring of the aircraft. In some examples, the aircraft monitoring system includes multiple fisheye lens systems positioned throughout the aircraft. The aircraft monitoring system advantageously provides improved monitoring and recording of events that take place on an aircraft.

32 Claims, 6 Drawing Sheets

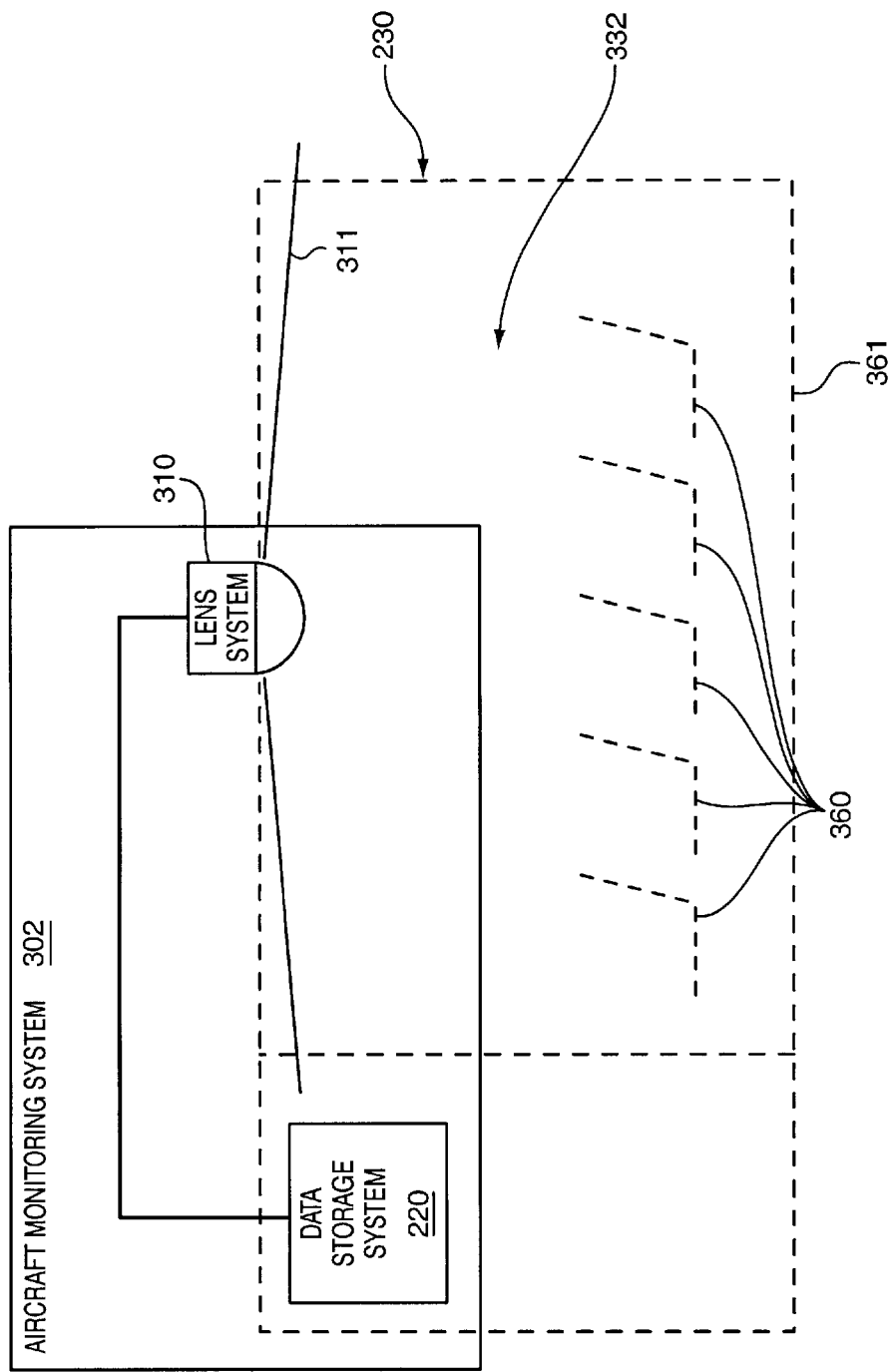

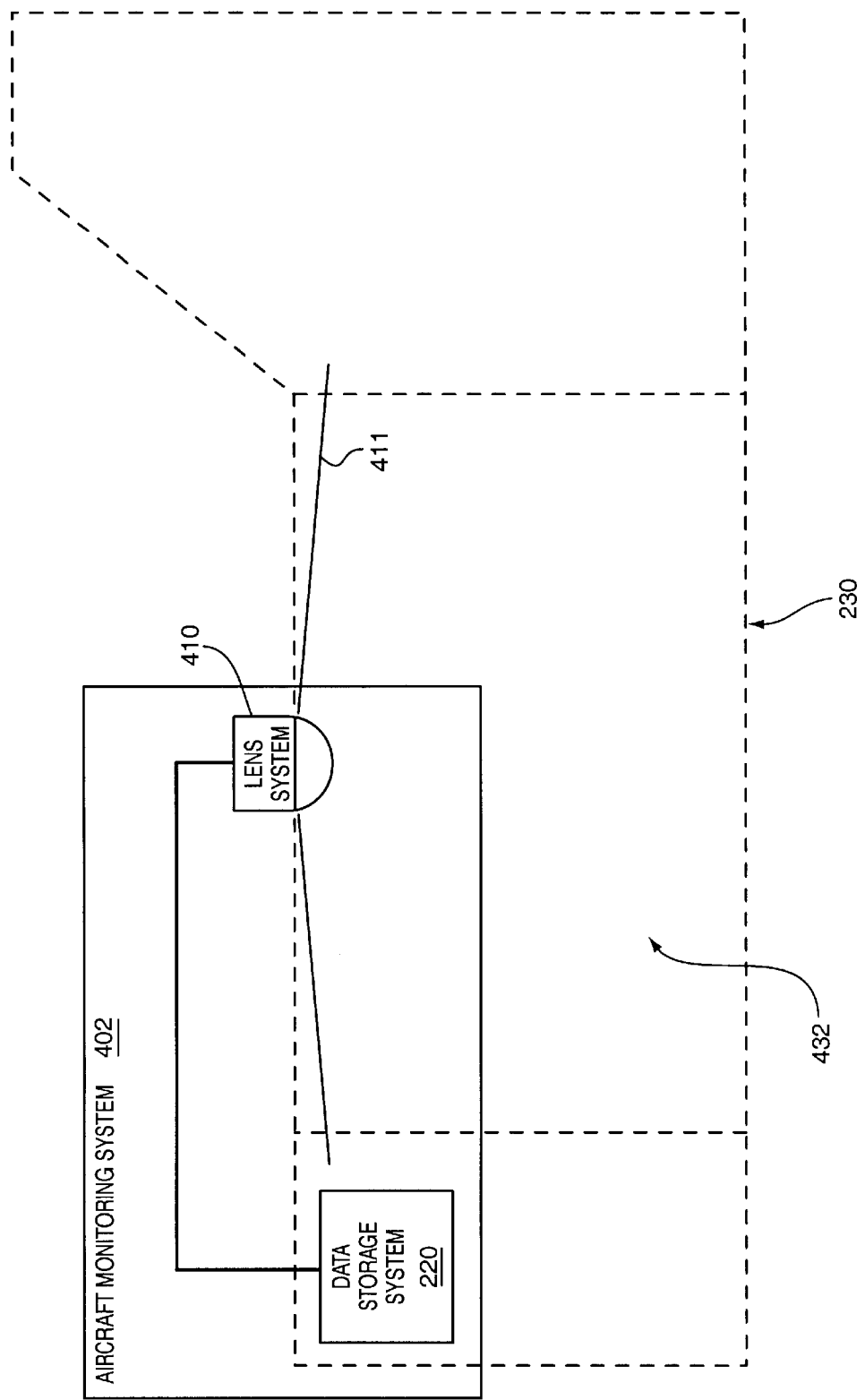

METHOD AND SYSTEM OF MONITORING AN AIRCRAFT USING A FISHEYE LENS SYSTEM

RELATED APPLICATIONS

This application claims priority to provisional application 60/166,294 filed Nov. 18, 1999, which is expressly incorporated herein by reference.

BACKGROUND OF THE INVENTION

1. Field of the Invention

The invention is related to the field of monitoring systems, and in particular, to a method and system for monitoring and recording events happening on an aircraft.

2. Statement of the Problem

Aircraft are monitored and data is recorded to keep track of the performance of the flight crew, the performance of the pilot and flight crew in an emergency situation, the performance of the aircraft in an emergency situation, and a number of other reasons. A current system for monitoring aircraft is called a "black box", which is referred to herein as a flight recorder. The flight recorder records data on the aircraft and the flight crew. The flight recorder typically includes a Cockpit Voice Recorder (CVR), that records the conversations of the flight crew, and a Flight Data Recorder (FDR) that records instrument readings on the aircraft. The flight recorder is encased in an enclosure that is substantially crash proof. Crash investigators, such as members of the National Traffic Safety Board (NTSB), use the data recorded by the flight recorder to help determine the cause of a crash.

The current flight recorders are unfortunately insufficient to provide enough helpful data for crash investigators. Voice recordings and instrument measurements are not enough information in some situations to reveal all of the events taking place on an aircraft that has crashed. The current flight recorders are non-visual and do not fully document the range of the flight crew actions and communications. Some vehicles have been equipped with video recording systems to alleviate similar problems. Some examples are U.S. Pat. Nos. 4,949,186, 4,789,904, and 4,843,463, which are expressly incorporated herein by reference. Unfortunately, the video recording systems have not been sufficiently adapted for use on an aircraft.

The current flight recorders unfortunately store recorded data on a storage system on the aircraft. The recorded data could be lost because of the severity of a crash. The recorded data could be lost for other reasons. For instance, on Oct. 25, 1999, a LearJet 35 departed from Orlando, Fla. Within 30 minutes of departure, air traffic control lost all voice contact with the crew of the jet. The jet, under its own power and without pilot intervention, continued to fly for 5–6 hours until its eventual crash. The jet's CVR was configured to run in continuous 30-minute loops. Therefore, data pertinent to the cause of the crash was written over and the CVR was useless to crash investigators.

The current flight recorders unfortunately run off of power supplied by the aircraft. Thus, if the aircraft loses all power, then the flight recorder on board also loses power. For instance, on May 11, 1996, the crew of ValuJet Flight 592 reported smoke and fire shortly after departing from Miami, Fla. The aircraft lost main power about 40 to 50 seconds before the aircraft crashed on its return to the airport. Consequently, the flight recorder did not record the last 40 to 50 seconds of the flight. The last 40 to 50 seconds would have been helpful to the crash investigators in determining the cause of the crash.

SUMMARY OF THE SOLUTION

The invention helps to solve the above problems with an aircraft monitoring system that captures visual images of an aircraft. The aircraft monitoring system advantageously records visual images of the aircraft in the event of a crash, transmits a real-time video signal to a ground controller for ground-based monitoring and recording of the aircraft, and transfers visual images of the aircraft to the cockpit to assist the flight crew in monitoring events happening on the aircraft. The aircraft monitoring system consequently improves flight safety and provides higher-quality and more reliable data to crash investigators.

The aircraft monitoring system is comprised of a first fisheye lens system and a data storage system. The first fisheye lens system is configured to mount in the aircraft. The first fisheye lens system captures first images that represent a hemispherical field of view of about 180-degrees. The field of view is of a first interior portion of the aircraft. The first fisheye lens transfers the first images to the data storage system. The data storage system stores the first images.

In one example, the first fisheye lens system is mounted in the cockpit of the aircraft. The first fisheye lens system captures the first images, which represent cockpit images, and the data storage system stores the cockpit images. The aircraft monitoring system advantageously records activities in the cockpit using a single camera with a fisheye lens.

In one example, the aircraft monitoring system further includes a second fisheye lens system configured to communicate with the data storage system and capture second images. The second fisheye lens system is preferably mounted in a cabin of the aircraft. The second fisheye lens system captures the second images, representing cabin images, and the data storage system stores the cabin images.

In one example, the aircraft monitoring system further includes a third fisheye lens system configured to communicate with the data storage system and capture third images. The third fisheye lens system is mounted in a luggage compartment of the aircraft. The third fisheye lens system captures the third images, representing luggage compartment images, and the data storage system stores the luggage compartment images.

In one example, the aircraft monitoring system further comprises a video transmitter configured to communicate with the first fisheye lens system, the second fisheye lens system, and/or the third fisheye lens system. The video transmitter receives images from the fisheye lens system(s) and transmits the images over a video signal. A ground controller receives the video signal and displays the images. The ground controller could be a control tower in an airport. The video transmitter advantageously allows for ground-based monitoring and recording of flight data.

In one example, the aircraft monitoring system further comprises a display system configured to communicate with the second fisheye lens system and/or the third fisheye lens system. The display system is mounted in the cockpit of the aircraft. The display system receives images from the fisheye lens system(s) and displays the images for viewing by the flight crew of the aircraft. The display system advantageously allows the flight crew to monitor activities and events occurring inside the aircraft.

In one example, the aircraft monitoring system further comprises an independent power supply coupled to any component in the aircraft monitoring system. The independent power supply is separate from any other aircraft power supply. The aircraft monitoring system advantageously operates even if the aircraft loses power.

DESCRIPTION OF THE DRAWINGS

FIG. 3 is a block diagram that illustrates an aircraft monitoring system with a fisheye lens system mounted in a cabin of an aircraft in an example of the invention.

FIG. 4 is a block diagram that illustrates an aircraft monitoring system with a fisheye lens system mounted in a luggage compartment of an aircraft in an example of the invention.

DETAILED DESCRIPTION OF THE INVENTION

Figure 1:
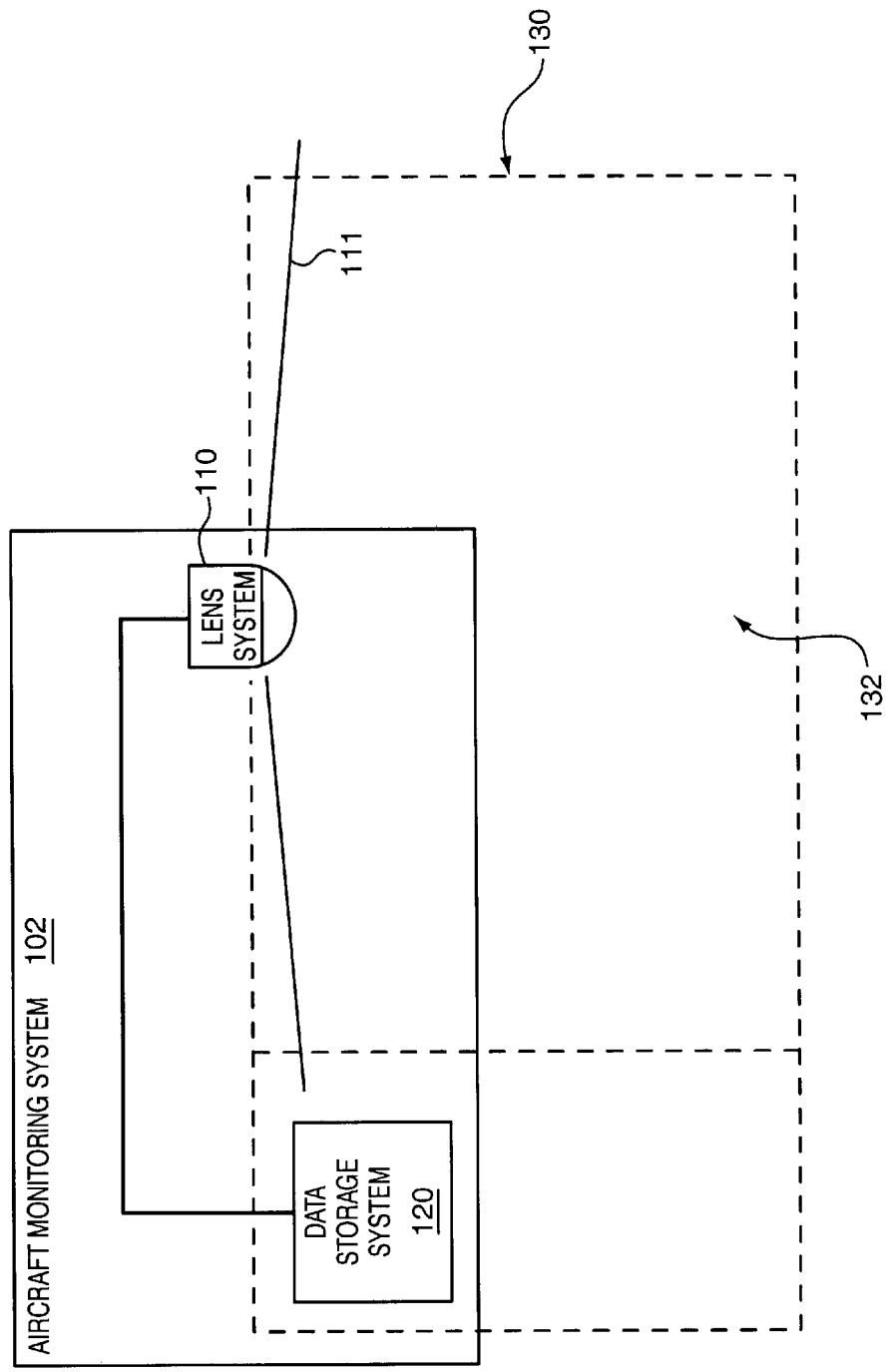
FIG. 1 is a block diagram that illustrates an aircraft monitoring system in an example of the invention.

System and Method of Aircraft Monitoring—FIG. 1

FIG. 1 depicts a specific example of an aircraft monitoring system in accord with the present invention. Those skilled in the art will appreciate numerous variations from this example that do not depart from the scope of the invention. Those skilled in the art will also appreciate that various features described could be combined with other embodiments to form multiple variations of the invention. Those skilled in the art will appreciate that some conventional aspects of FIG. 1 have been simplified or omitted for clarity.

FIG. 1 is a block diagram that illustrates aircraft monitoring system 102 in an example of the invention. Aircraft monitoring system 102 is comprised of fisheye lens system 110 and data storage system 120. Fisheye lens system 110 is configured to communicate with data storage system 120. Fisheye lens system 110 is configured to mount in an aircraft 130. An aircraft is defined as a machine capable of flight. A section of aircraft 130 is shown in FIG. 1.

In operation, fisheye lens system 110 captures images representing a hemispherical field of view 111 of about 180-degrees. About 180-degrees means 180-degrees +/−5-degrees. The hemispherical field of view is of an interior portion 132 of aircraft 130. Fisheye lens system 110 transfers the images to data storage system 120. Data storage system 120 receives the images from fisheye lens system 110. Data storage system 120 stores the images.

Aircraft Monitoring Systems—FIGS. 2–5

FIGS. 2–5 depict specific examples of aircraft monitoring systems in accord with the present invention. Those skilled in the art will appreciate numerous variations from these examples that do not depart from the scope of the invention. Those skilled in the art will also appreciate that various features described could be combined with other embodiments to form multiple variations of the invention. Those skilled in the art will appreciate that some conventional aspects of the FIGS. 2–5 have been simplified or omitted for clarity.

Figure 2A:
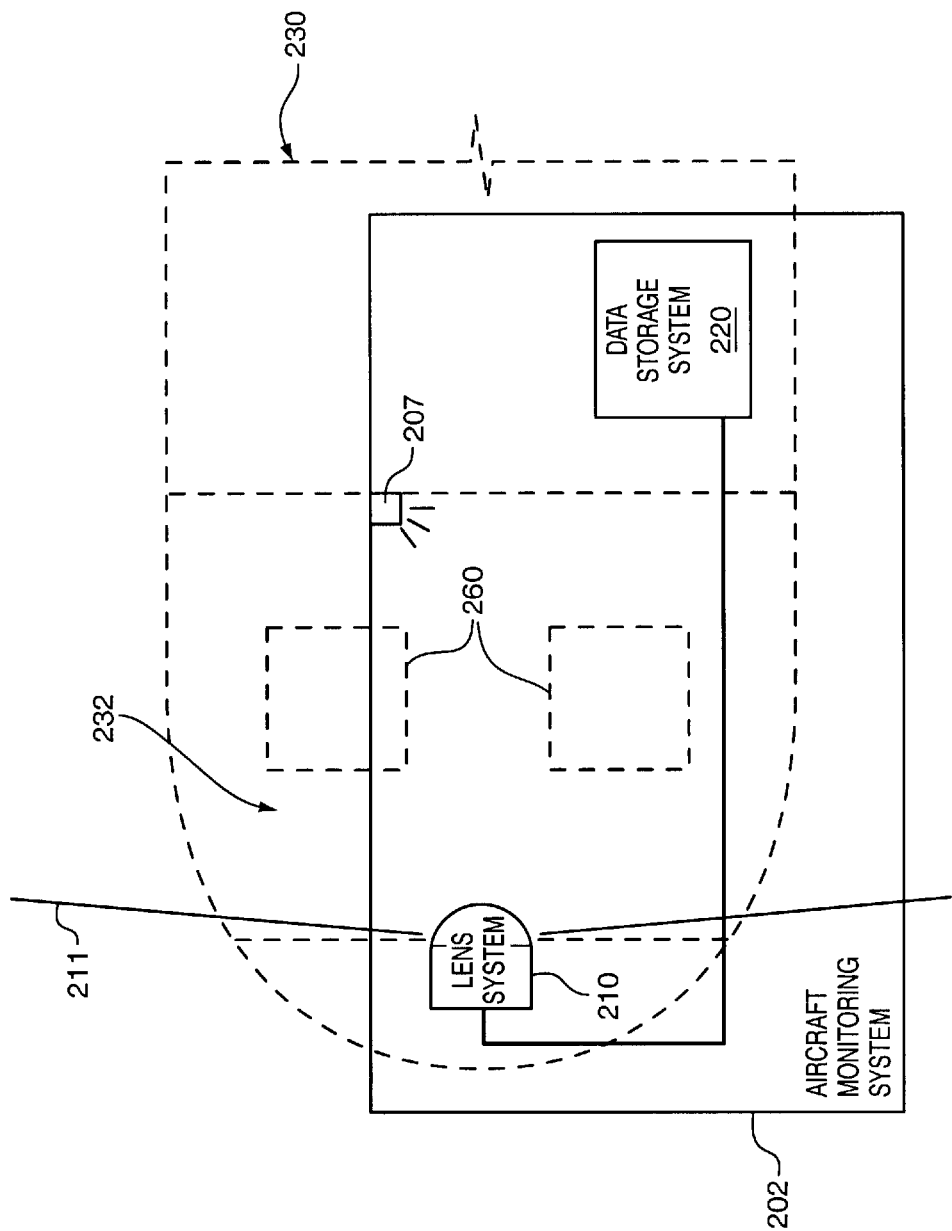
FIG. 2a is a block diagram that illustrates an aircraft monitoring system with a fisheye lens system mounted in a cockpit of an aircraft in an example of the invention.

FIG. 2a is a block diagram that illustrates aircraft monitoring system 202 in an aircraft 230 in an example of the invention. FIG. 2a shows a top view of the cockpit of aircraft 230. Blocks 260 in the cockpit represent seats in aircraft 230 for a flight crew. Aircraft monitoring system 202 is comprised of fisheye lens system 210 and data storage system 220. Fisheye lens system 210 is shown as being installed in the front of the cockpit, such as in the instrument panel, and positioned to face toward the back of the cockpit. The cockpit is defined as an area in an aircraft for a flight crew. Those skilled in the art will appreciate that the scope of this example of the invention includes fisheye lens system 210 mounted in other locations in the cockpit. Data storage system 220 could be a black box. A black box is a device that records flight information of an aircraft. The black box could include a Cockpit Voice Recorder (CVR) and a Flight Data Recorder (FDR).

Figure 2B:
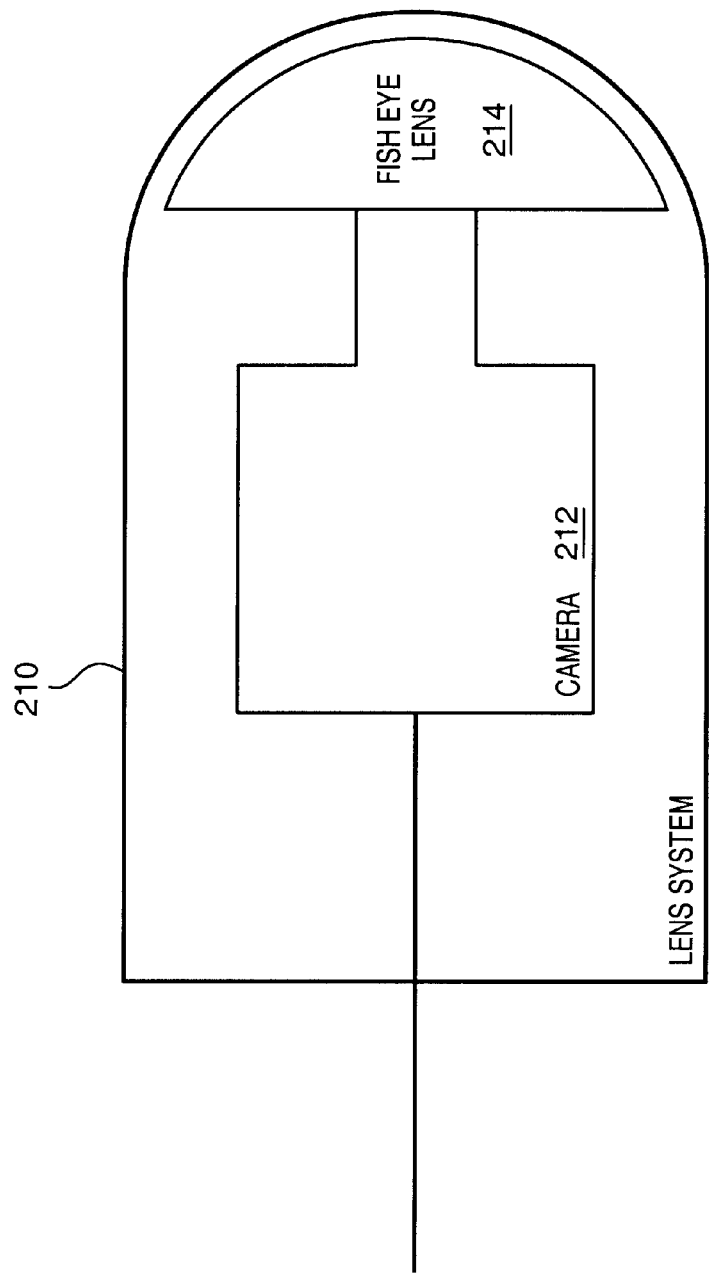
FIG. 2b is a block diagram that illustrates a fisheye lens system in an example of the invention.

Fisheye lens system 210 could be comprised of a camera 212 equipped with a fisheye lens 214, as shown in FIG. 2b. Camera 212 could be a video camera or a digital camera. An example of fisheye lens 214 is described and shown in commonly-owned and co-pending patent application Ser. No. 09/570,502, which is expressly incorporated herein by reference. Proper operation of fisheye lens system 210 depends greatly on the properties of fisheye lenses for extreme wide-angle video capture. Fisheye lenses are designed to image a scene with a rotationally symmetric image distribution that depends only on the focal length of the lens and the angle of the object in the scene. Unlike rectilinear lenses, fisheye lenses intentionally do not map rectangular coordinates onto rectangular image coordinates, but instead have extreme barrel distortion associated with f-theta mapping. Fisheye imaging is particularly useful when high-performance imaging is required over extremely large fields of view. The short paraxial focal length of the fisheye lens produces extremely large depth of field so that nearly all of the object space are in sharp focus at once. Fisheye lens system 210 is advantageously capable of capturing high-resolution images of small, enclosed spaces such as the cockpit of aircraft 230.

The operation aircraft monitoring system 202 is as follows. Fisheye lens system 210 captures images representing a hemispherical field of view 211 of about 180-degrees. The hemispherical field of view is of an interior portion 232 of aircraft 230. The interior portion 232 in this example is the cockpit of aircraft 230. Fisheye lens system 210 advantageously captures a substantial portion of the cockpit with a single fisheye lens 214 and eliminates the need for multiple cameras.

Fisheye lens system 210 transfers the images to data storage system 220. Data storage system 220 receives the images from fisheye lens system 210 and stores the images. Data storage system 220 is encased in a substantially crash-proof enclosure. Crash-proof enclosures are well known and currently used for black boxes.

Aircraft monitoring system 202 could also include a near-infrared illuminator 207 mounted in the cockpit outside of the pilot's visual spectrum. The illuminator (780–890 nm) provides nighttime and low-light illumination without interfering with the pilot's vision.

FIG. 3 is a block diagram that illustrates aircraft monitoring system 302 in aircraft 230 in an example of the invention. FIG. 3 shows a side view of the cabin of aircraft 230. The cabin is shown to include passenger seats 360. Aircraft monitoring system 302 is comprised of fisheye lens system 310 and data storage system 220. Fisheye lens system 310 is shown as being installed in the ceiling of the cabin and positioned to face toward the floor 361 of the cabin. The cabin is defined as a compartment in an aircraft for passengers. Those skilled in the art will appreciate that the scope of this example of the invention includes fisheye lens system 310 mounted in other locations in the cabin.

In operation, fisheye lens system 310 captures images representing a hemispherical field of view 311 of about 180-degrees. The hemispherical field of view is of an interior portion 332 of aircraft 230. The interior portion 332 in this example is the cabin of aircraft 230. Fisheye lens system 310 could include a rectangular image sensor, such as a HDTV sensor. The sensor preferably has a 2:1 aspect ratio to cover a 180-degrees by 90-degrees cabin field of view using a single fisheye lens. The rectangular sensor is effective in capturing elongated spaces, such as the cabin of a commercial aircraft. Fisheye lens system 310 transfers the images to data storage system 220. Data storage system 220 receives the images from fisheye lens system 310 and stores the images.

Aircraft monitoring system 310 advantageously aids in prevention and prosecution of Passenger Interference. Passenger Interference is defined as passengers who hinder the flight crew or flight attendants from performing their duties. Aircraft monitoring system 310 also records conditions and activities in the cabin in the event of a crash to aid in the crash investigation.

FIG. 4 is a block diagram that illustrates aircraft monitoring system 402 in aircraft 230 in an example of the invention. FIG. 4 shows a side view of the luggage compartment of aircraft 230. Aircraft monitoring system 402 is comprised of fisheye lens system 410 and data storage system 220. Fisheye lens system 410 is shown as being installed in the ceiling of the luggage compartment and positioned to face toward the floor of the luggage compartment. The luggage compartment is defined as any area in an aircraft for storage items or materials, such as luggage. Those skilled in the art will appreciate that the scope of this example of the invention includes fisheye lens system 410 mounted in other locations in the luggage compartment.

In operation, fisheye lens system 410 captures images representing a hemispherical field of view 411 of about 180-degrees. The hemispherical field of view is of an interior portion 432 of aircraft 230. The interior portion 432 in this example is the luggage compartment of aircraft 230. Fisheye lens system 410 transfers the images to data storage system 220. Data storage system 220 receives the images from fisheye lens system 410 and stores the images.

Figure 5:
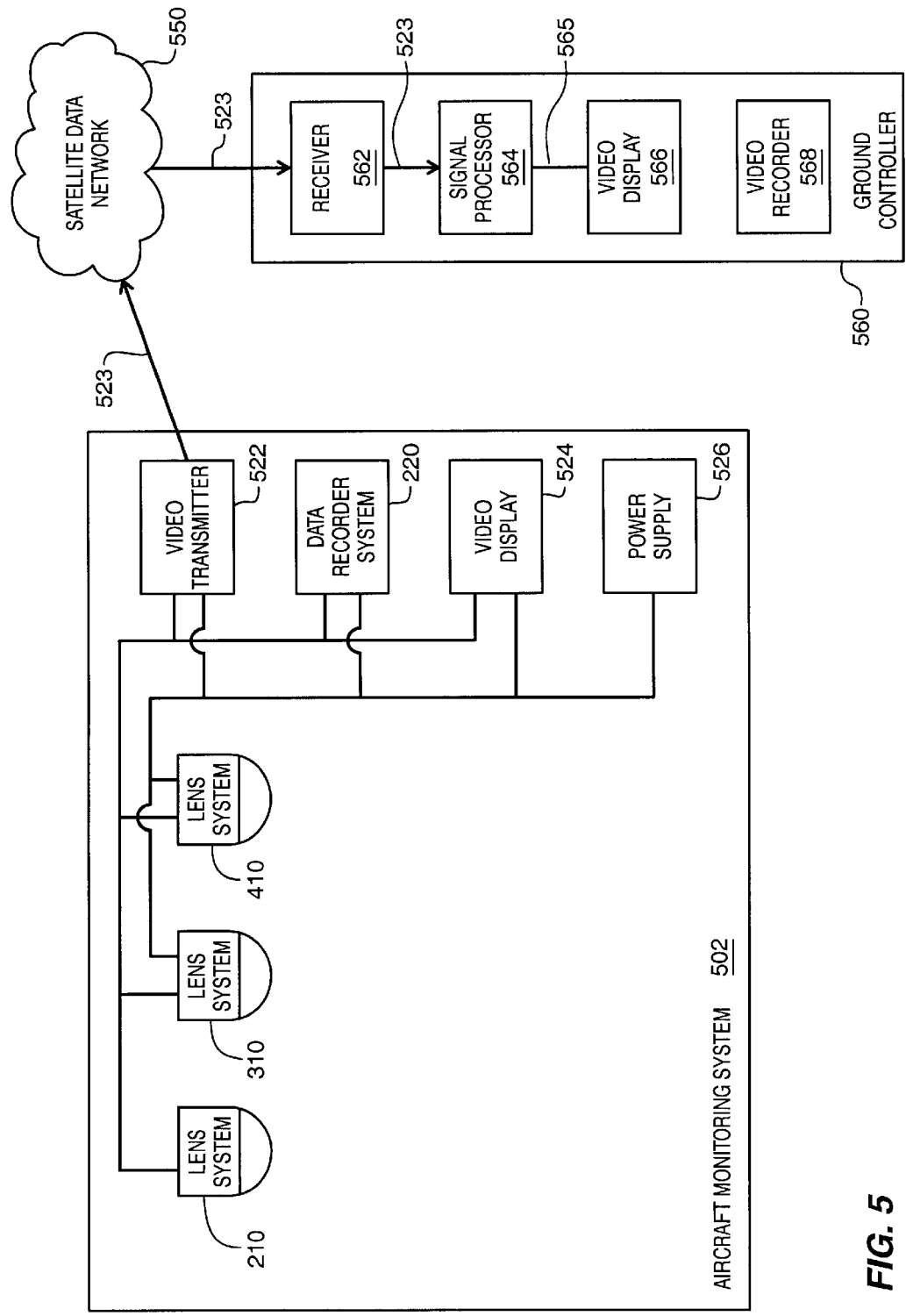
FIG. 5 is a block diagram that illustrates a schematic of an aircraft monitoring system implementing three fisheye lens systems in an example of the invention.

FIG. 5 is a block diagram that illustrates a high-level schematic of aircraft monitoring system 502. Aircraft monitoring system 502 is comprised of fisheye lens system 210, fisheye lens system 310, fisheye lens system 410, data recorder system 220, video transmitter 522, video display 524, and power supply 526. Fisheye lens systems 210, 310, and 410 are coupled to data recorder system 220, video transmitter 522, and power supply 526. Fisheye lens systems 310 and 410 are coupled to video display 524. Video transmitter 522 is configured to communicate with a ground controller 560 through a satellite data network 550. Ground controller 560 is comprised of receiver 562, signal processor 564, video display 566, and video recorder 568.

In operation, fisheye lens system 210 captures cockpit images from the cockpit of aircraft 230. Fisheye lens system 210 transfers the cockpit images to data storage system 220. Data storage system 220 receives the cockpit images from fisheye lens system 210 and stores the cockpit images. Fisheye lens system 210 also transfers the cockpit images to video transmitter 522. Video transmitter 522 converts the cockpit images into video signal 523 and transfers video signal 523 to satellite data network 550. Video signal 523 is preferably a real-time signal; however signal 523 can alternatively be a burst of video data with time stamp information. Video signal 523 could also be a microwave signal.

Satellite data network 550 receives video signal 523 and transfers video signal 523 to ground controller 560. Receiver 562 receives video signal 523 and transfers video signal 523 to signal processor 564. Signal processor 564 processes video signal 523 to generate video display signal 565 that represents the cockpit images. Video display 566 receives video display signal 565 and displays the cockpit images. Video recorder 568 also receives the cockpit images and stores the cockpit images. Video transmitter 522 advantageously provides remote digital monitoring and recording of cockpit conditions from the ground, which is especially useful during emergency conditions.

Fisheye lens system 310 captures cabin images from the cabin of aircraft 230. Fisheye lens system 310 transfers the cabin images to data storage system 220. Data storage system 220 receives the cabin images from fisheye lens system 310 and stores the cabin images. Fisheye lens system 310 also transfers the cabin images to video transmitter 522. Video transmitter 522 converts the cabin images into video signal 523 and transfers video signal 523 to satellite data network 550. Satellite data network 550 transfers video signal 523 to ground controller 560 as described above. Video display 566 displays the cabin images and video recorder 568 records the cabin images.

Fisheye lens system 310 also transfers the cabin images to video display 524. Video display 524 is positioned in the cockpit of aircraft 230 so that the flight crew can monitor activities in the cabin. Video display 524 receives the cabin images and displays the cabin images for viewing by the flight crew. Video display 524 could be a Closed Circuit TV (CCTV). Video display 524 advantageously provides direct visual confirmation of cabin conditions to the pilot and flight crew.

Fisheye lens system 410 captures luggage compartment images from the luggage compartment of aircraft 230. Fisheye lens system 410 transfers the luggage compartment images to data storage system 220. Data storage system 220 receives the luggage compartment images from fisheye lens system 410 and stores the luggage compartment images. Fisheye lens system 410 also transfers the luggage compartment images to video transmitter 522. Video transmitter 522 converts the luggage compartment images into video signal 523 and transfers video signal 523 to satellite data network 550. Satellite data network 550 transfers video signal 523 to ground controller 560 as described above. Video display 566 displays the luggage compartment images and video recorder 568 records the luggage compartment images.

Fisheye lens system 410 also transfers the luggage compartment images to video display 524. Video display 524 is positioned in the cockpit of aircraft 230 so that the flight crew can monitor activities in the luggage compartment. Video display 524 receives the luggage compartment images and displays the luggage compartment images for viewing by the flight crew. Video display 524 advantageously provides direct visual confirmation of luggage compartment conditions to the pilot and flight crew. Video display 524 could display the cabin images and the luggage compartment on a split-screen or alternate full-views of the images.

The components of aircraft monitoring system 502 are connected to power supply 526. Power supply 526 is an independent power supply, which means that power supply 526 does not draw power from any other power supply on aircraft 230. Power supply 526 advantageously provides power to the components of aircraft monitoring system 502 even if aircraft 230 loses all power. In such a case, aircraft monitoring system 502 may be able to reveal how aircraft power was lost and what events took place after the power was lost.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method of recording events on an aircraft, the method comprising:
   mounting a first fisheye lens system in said aircraft;
   capturing first images representing a hemispherical field of view of about 180-degrees of a first interior portion of said aircraft using said first fisheye lens system; and
   storing said first images in a data storage system.

2. The method of claim 1 wherein said first interior portion comprises a cockpit of said aircraft.

3. The method of claim 1 further comprising transmitting said first images over a video signal.

4. The method of claim 1, further comprising transmitting said first images wirelessly from said aircraft to a remote ground control station.

5. The method of claim 1 further comprising mounting a second fisheye lens system in said aircraft and capturing second images representing a hemispherical field of view of about 180-degrees of a second interior portion of said aircraft using said second fisheye lens system, wherein said second interior portion comprises a cabin of said aircraft.

6. The method of claim 5 further comprising storing said second images in said data storage system.

7. The method of claim 5 further comprising transmitting said second images over a video signal.

8. The method of claim 5, further comprising transmitting said second images wirelessly from said aircraft to a remote ground control station.

9. The method of claim 5 further comprising displaying said second images in a cockpit of said aircraft.

10. The method of claim 5 further comprising mounting a third fisheye lens system in said aircraft and capturing third images representing a hemispherical field of view of about 180-degrees of a third interior portion of said aircraft using said third fisheye lens system, wherein said third interior portion comprises a luggage compartment of said aircraft.

11. The method of claim 10, further comprising storing said third images in said data storage system.

12. The method of claim 10 further comprising transmitting said third images over a video signal.

13. The method of claim 10 further comprising displaying said third images in a cockpit of said aircraft.

14. The method of claim 10, further comprising transmitting said third images wirelessly from said aircraft to a remote ground control station.

15. The method of claim 1 wherein said data storage system comprises a black box.

16. The method of claim 1 wherein said first fisheye lens system and said data storage system are configured to couple to an independent power supply that is separate from standard power supplies on said aircraft.

17. An aircraft monitoring system for monitoring events on an aircraft, comprising:
   a first fisheye lens system configured to mount in an aircraft, capture first images representing a hemispherical field of view of about 180-degrees of a first interior portion of said aircraft, and transfer said first images; and
   a data storage system configured to communicate with said first fisheye lens system, receive said first images from said first fisheye lens system, and store said first images.

18. The aircraft monitoring system of claim 17 wherein said first interior portion comprises a cockpit of said aircraft.

19. The aircraft monitoring system of claim 17 further comprising a video transmitter configured to communicate with said first fisheye lens system, receive said first images from said first fisheye lens system, and transmit said first images over a video signal.

20. The aircraft monitoring system of claim 17 further comprising a second fisheye lens system configured to mount in said aircraft, capture second images representing a hemispherical field of view of about 180-degrees of a second interior portion of said aircraft, and transfer said second images, wherein said second interior portion comprises a cabin of said aircraft.

21. The aircraft monitoring system of claim 20 wherein said data storage system is further configured to receive said second images from said second fisheye lens system and store said second images.

22. The aircraft monitoring system of claim 20 further comprising a video transmitter configured to communicate with said second fisheye lens system, receive said second images from said second fisheye lens system, and transmit said second images over a video signal.

23. The aircraft monitoring system of claim 20 further comprising a video display configured to communicate with said second fisheye lens system, mount in a cockpit of said aircraft, receive said second images from said second fisheye lens system, and display said second images.

24. The aircraft monitoring system of claim 20 further comprising a third fisheye lens system configured to mount in said aircraft, capture third images representing a hemispherical field of view of about 180-degrees of a third interior portion of said aircraft, and transfer said third images, wherein said third interior portion comprises a luggage compartment of said aircraft.

25. The aircraft monitoring system of claim 24 wherein said data storage system is further configured to receive said third images from said third fisheye lens system and store said third images.

26. The aircraft monitoring system of claim 24 further comprising a video transmitter configured to communicate with said third fisheye lens system, receive said third images from said third fisheye lens system, and transmit said third images over a video signal.

27. The aircraft monitoring system of claim 24 further comprising a video display configured to communicate with said third fisheye lens, mount in a cockpit of said aircraft, receive said third images from said third fisheye lens system, and display said third images.

28. The aircraft monitoring system of claim 17 wherein said data storage system comprises a black box.

29. The aircraft monitoring system of claim 17 further comprising an independent power supply configured to couple to said first fisheye lens system and said data storage system, wherein said independent power supply is separate from standard power supplies on said aircraft.

30. The method of claim 1, comprising the additional step of illuminating the first interior portion of said aircraft using an illuminator emitting a wavelength between 780 nm and 890 nm.

31. The system of claim 17, further comprising an illuminator for illuminating the first interior portion of said aircraft.

32. The system of claim 31, the illuminator emitting a wavelength between 780 nm and 890 nm.

* * * * *